(12) United States Patent
Mihara

(10) Patent No.: US 9,969,865 B2
(45) Date of Patent: May 15, 2018

(54) RUBBER COMPOSITION FOR TIRE

(71) Applicant: The Yokohama Rubber Co., LTD., Minato-ku, Tokyo (JP)

(72) Inventor: Satoshi Mihara, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days. days.

(21) Appl. No.: 15/322,071

(22) PCT Filed: Jun. 26, 2015

(86) PCT No.: PCT/JP2015/068515
§ 371 (c)(1),
(2) Date: Feb. 7, 2017

(87) PCT Pub. No.: WO2015/199223
PCT Pub. Date: Dec. 30, 2015

(65) Prior Publication Data
US 2017/0152370 A1 Jun. 1, 2017

(30) Foreign Application Priority Data
Jun. 26, 2014 (JP) .................................. 2014-131174

(51) Int. Cl.
*B60C 1/00* (2006.01)
*C08K 3/36* (2006.01)
*C08L 9/06* (2006.01)
*C08K 5/548* (2006.01)

(52) U.S. Cl.
CPC ............ *C08K 5/548* (2013.01); *B60C 1/0016* (2013.01); *C08K 3/36* (2013.01); *C08L 9/06* (2013.01)

(58) Field of Classification Search
CPC ........ C08K 3/36; C08K 5/548; B60C 1/0016; C08L 9/06
USPC ...................................................... 524/575
See application file for complete search history.

(56) References Cited

U.S. PATENT DOCUMENTS

| 2011/0136962 | A1 | 6/2011 | Hattori et al. |
| 2011/0294936 | A1 | 12/2011 | Sato |
| 2013/0172443 | A1* | 7/2013 | Kushida .................... B60C 1/00 523/156 |
| 2015/0375566 | A1 | 12/2015 | Akahori et al. |

FOREIGN PATENT DOCUMENTS

| EP | 2 332 743 | | 6/2011 | |
| JP | H09-048880 | | 2/1997 | |
| JP | 2013-213134 | | 10/2013 | |
| JP | 2013213134 | A * | 10/2013 | |
| JP | 2014-001339 | | 1/2014 | |
| JP | 2014-001357 | | 1/2014 | |
| JP | 2014001339 | A * | 1/2014 | |
| JP | 2014001357 | A * | 1/2014 | |
| JP | 2014-019756 | | 2/2014 | |
| WO | WO 2012/035998 | | 3/2012 | |
| WO | WO 2012035998 | A1 * | 3/2012 | ............... B60C 1/00 |
| WO | WO 2013/040425 | | 3/2013 | |
| WO | WO 2014/002750 | | 1/2014 | |

OTHER PUBLICATIONS

International Search Report for International Application No. PCT/JP2015/068515 dated Sep. 15, 2015, 4 pages, Japan.

* cited by examiner

*Primary Examiner* — Michael M Bernshteyn
(74) *Attorney, Agent, or Firm* — Thorpe North & Western

(57) ABSTRACT

A rubber composition for tires comprises a diene rubber, silica, and a silane coupling agent, and is characterized in that a function v of a shear modulus G' of the rubber composition at 0.28% shear stress at 110° C., a CTAB specific surface area (CTAB) of the silica, a volume fraction ($\varphi$) of the silica in the rubber composition, and a stress at 100% elongation ($M_{100}$) of the rubber composition satisfies the relationship of the following equation (i): $G'=K \times v$, where K is a coefficient greater than 0 and not greater than 450, and v is represented by the following equation (ii): $v=\varphi \times (1+0.0258 \times CTAB \times M_{100})$ and is a real number not less than 2.5 and not greater than 20.

8 Claims, 1 Drawing Sheet

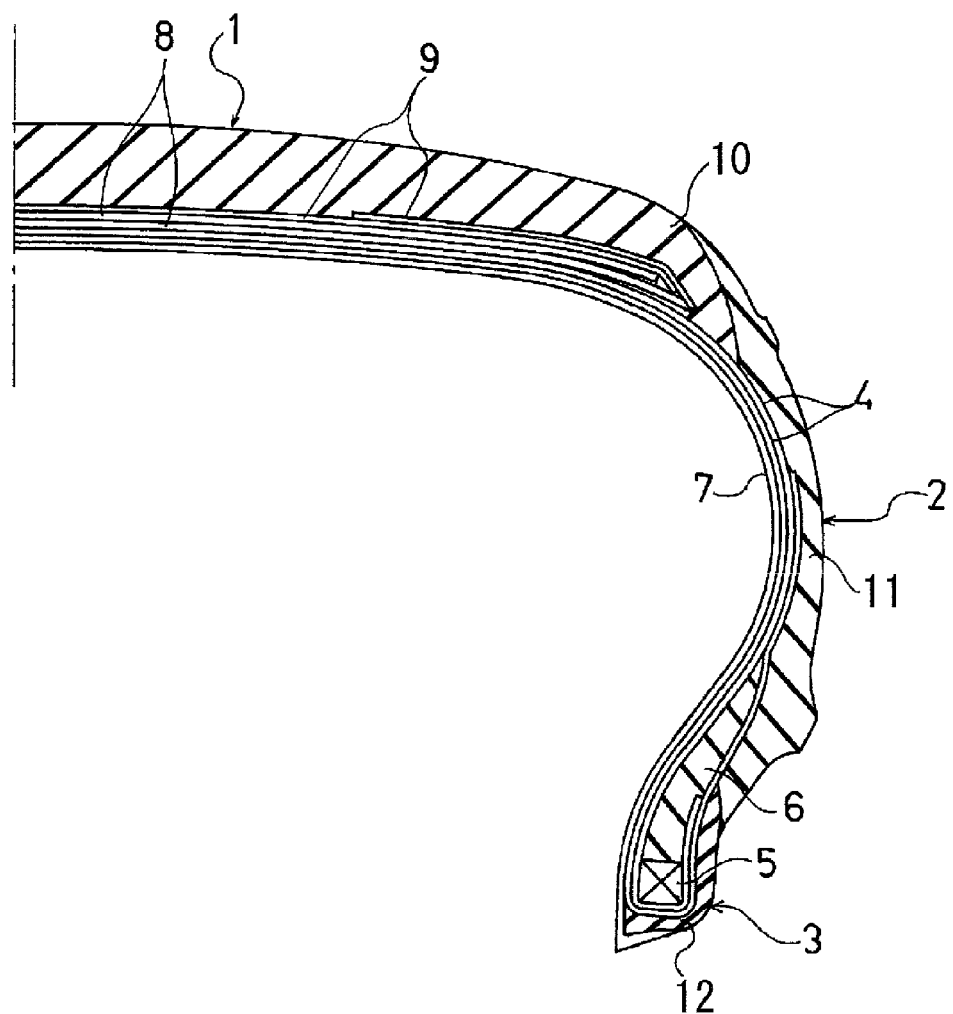

RUBBER COMPOSITION FOR TIRE

TECHNICAL FIELD

The present technology relates to a rubber composition for tires having high levels of both low rolling resistance and wet grip performance.

BACKGROUND ART

Reducing rolling resistance of pneumatic tires is demanded for enhancing fuel economy performance of vehicles.

At the same time, providing excellent wet grip performance is essential to a pneumatic tire.

In general, silica is blended in rubber compositions for tires to improve low rolling resistance and wet grip performance.

It is empirically known that the wet grip performance of a rubber composition can be improved by increasing the blended amount of silica.

However, when the amount of silica is increased, there is generally the problem that the dispersibility of the silica deteriorates and rolling resistance ends up increasing.

That is, it is difficult to improve both low rolling resistance and wet grip performance with a rubber composition containing a large blended amount of silica.

International Patent Application Publication No. WO/2014/002750 proposes blending certain silane coupling agents containing a mercapto group to improve the dispersibility of silica.

However, when the blended amount of silica was high, silica dispersibility was not necessarily sufficiently improved even when such a silane coupling agent was blended. Thus, achieving both low rolling resistance and wet grip performance at a higher level has still been demanded.

SUMMARY

The present technology is to provide a rubber composition for tires having low rolling resistance and wet grip performance enhanced to or beyond conventional levels.

The rubber composition for tires of the present technology comprises a diene rubber, silica, and a silane coupling agent, characterized in that a function $v$ of a shear modulus $G'$ of the rubber composition at 0.28% shear stress at 110° C., a CTAB (cetyl trimethylammonium bromide) specific surface area (CTAB) of the silica, a volume fraction ($\varphi$) of the silica in the rubber composition, and a stress at 100% elongation ($M_{100}$) of the rubber composition satisfies the relationship of equation (i) below, and the function $v$ is a real number not less than 2.5 and not greater than 20.

$$G' = K \times v \tag{i}$$

In equation (i), $G'$ is the shear modulus (MPa) at 0.28% shear stress at 110° C., K is a coefficient greater than 0 and not greater than 450, and $v$ is a function represented by equation (ii) below and is a real number not less than 2.5 and not greater than 20.

$$v = \varphi \times (1 + 0.0258 \times CTAB \times M_{100}) \tag{ii}$$

In equation (ii), $\varphi$ is the volume fraction of the silica in the rubber composition, CTAB is the CTAB specific surface area (m²/g) of the silica, and $M_{100}$ is the stress (MPa) of the rubber composition at 100% elongation at 23° C.

The rubber composition for tires of the present technology can achieve a balance of both low rolling resistance and wet grip performance beyond conventional levels because it contains a diene rubber, silica, and a silane coupling agent, and a function $v$ ($v = \varphi \times (1 + 0.0258 \times CTAB \times M_{100})$) of a shear modulus $G'$ of the rubber composition at 0.28% shear stress at 110° C., a CTAB specific surface area (CTAB) of the silica, a volume fraction ($\varphi$) of the silica in the rubber composition, and a stress at 100% elongation ($M_{100}$) of the rubber composition satisfies the above-mentioned equation (i) ($G' = K \times v$), and $0 < K \le 450$, and $2.5 \le v \le 250$.

The silane coupling agent preferably contains a mercapto group.

Furthermore, it is preferably a polysiloxane having an average composition formula represented by the below-mentioned general formula (1).

$$(A)_a(B)_b(C)_c(D)_d(R^1)_e SiO_{(4-2a-b-c-d-e)/2} \tag{1}$$

In the formula, A is a bivalent organic group containing a sulfide group; B is a monovalent hydrocarbon group having from 5 to 10 carbons; C is a hydrolyzable group; D is an organic group containing a mercapto group; $R^1$ is a monovalent hydrocarbon group having from 1 to 4 carbons; and a to e satisfy the relationships $0 \le a < 1$, $0 \le b < 1$, $0 < c < 3$, $0 < d < 1$, $0 \le e < 2$, and $0 < 2a+b+c+d+e < 4$;

and at least one of a and b is not 0.)

In the silane coupling agent represented by the above-mentioned general formula (1), $0 < a < 1$ and $0 < c < 3$, and A, C, and D are represented by general formulas (2), (3), and (4), respectively, below.

$$*-(CH_2)_n-S_x-(CH_2)_n-* \tag{2}$$

In general formula (2), n denotes an integer from 1 to 10, x denotes an integer from 1 to 6, and * denotes a bond position.

$$*-OR^2 \tag{3}$$

In general formula (3), $R^2$ denotes an alkyl group having from 1 to 20 carbons, an aryl group having from 6 to 10 carbons, or an alkenyl group having from 2 to 10 carbons, and * denotes a bond position.

$$*-(CH_2)_m-SH \tag{4}$$

In general formula (4), m denotes an integer from 1 to 10, and * denotes a bond position.

A pneumatic tire that uses the rubber composition for tires described above can have low rolling resistance and wet grip performance improved beyond conventional levels.

BRIEF DESCRIPTION OF DRAWINGS

FIG. 1 is a partial cross-sectional view in a tire meridian direction illustrating an example of an embodiment of a pneumatic tire in which the rubber composition for tires of the present technology is used.

DETAILED DESCRIPTION

FIG. 1 illustrates an example of an embodiment of a pneumatic tire in which a rubber composition for tires is used. The pneumatic tire includes a tread portion 1, a sidewall portion 2, and a bead portion 3.

In FIG. 1, in a pneumatic tire, two carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside.

An innerliner layer 7 is disposed inward of the carcass layer 4.

Two belt layer 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1.

The reinforcing cords of the two belt layers 8 are inclined with respect to the tire circumferential direction and the direction of the reinforcing cords of the different layers intersect with each other.

The belt cover layer 9 is disposed on an outer circumferential side of the belt layer 8.

The tread portion 1 is formed from a tread rubber layer 10 on an outer circumferential side of the belt cover layer 9.

The tread rubber layer 10 is preferably composed of the rubber composition for use in a tire tread of the present technology.

A side rubber layer 11 is disposed outward of the carcass layer 4 in each side wall portion 2, and a rim cushion rubber layer 12 is provided outward of the portion of the carcass layer 4 that is folded back around each of the bead portions 3.

The rubber composition for tires of the present technology is advantageously used in configuring the tread rubber layer 10.

The rubber composition tires of the present technology contains a diene rubber as a rubber component.

Examples of diene rubbers include natural rubber, isoprene rubber, butadiene rubber, styrene-butadiene rubber, acrylonitrile butadiene rubber, butyl rubber, ethylene-α-olefin rubber, and chloroprene rubber.

Of these, styrene-butadiene rubber, butadiene rubber, and natural rubber are preferable.

Due to silica being blended in the diene rubber, the low rolling resistance and wet grip performance of the rubber composition for tires of the present technology are improved.

However, when a large amount of silica is blended, the dispersibility of the silica deteriorates.

Conventionally, the dispersibility of silica is sometimes evaluated by the magnitude of the Payne effect.

The Payne effect is evaluated by, for example, the magnitude of the shear modulus G' at 0.28% strain, where a larger value of shear modulus G' at 0.28% strain indicates a larger Payne effect and poorer silica dispersibility.

Furthermore, it is known that when the shear modulus G' at 0.28% strain is small, the Payne effect is small and silica dispersibility is good.

The shear modulus G' at 0.28% strain may be measured using a viscoelasticity spectrometer.

On the other hand, it is thought that by further increasing the interaction between silica and the rubber components in a rubber composition in which silica is blended, the action and effect of silica, especially the effect of improving wet grip performance, can be further increased.

The strength of the interaction between silica and the rubber components can be evaluated by the total of the volume of silica in the rubber composition and the volume of bound rubber surrounding the dispersed silica particles.

Specifically, when silica dispersibility is poor, the amount of bound rubber is relatively small and interaction between the silica and the rubber components is small, and therefore, the characteristics of the rubber composition cannot be efficiently improved even when the blended amount of silica is increased.

In contrast, when silica dispersibility is good, the amount of bound rubber is relatively large and interaction between silica and the rubber components is larger, and the characteristics of the rubber composition can be efficiently improved.

As described above, looking at silica dispersibility and the action thereof from the viewpoints of Payne effect (shear modulus G' at 0.28% strain) and the amount of bound rubber, wet grip performance and low rolling resistance can both be achieved at a high level by increasing the volume of silica and bound rubber as much as possible and by minimizing the Payne effect.

The volume of silica is determined by the content and specific gravity of the silica in the rubber composition.

The volume of bound rubber can be measured as long as it is in the unvulcanized state, but in an industrial product such as a vulcanization-molded pneumatic tire, quantitative measurement is difficult.

For this reason, when the relationship between the volume of bound rubber in an unvulcanized rubber composition and the characteristics of a vulcanized rubber molded body obtained by vulcanization thereof was examined, it was discovered that the volume of bound rubber strongly correlates with the product ($\varphi \times CTAB \times M_{100}$) of the CTAB specific surface area (CTAB) of the silica, the volume fraction ($\varphi$) of the silica, and the stress at 100% elongation ($M_{100}$) of the rubber composition.

Thus, in this specification, the interaction of silica and the rubber components is evaluated using a function $v = \varphi \times (1 + 0.0258 \times CTAB \times M_{100})$ which correlates with the total volume of silica and bound rubber, using a value ($0.0258 \times \varphi \times CTAB \times M_{100}$) which correlates with the volume of bound rubber.

In the rubber composition for tires of the present technology, it is necessary that the function v of the shear modulus G' of the rubber composition at 0.28% shear stress at 110° C., the CTAB specific surface area (CTAB) of the silica, the volume fraction ($\varphi$) of the silica in the rubber composition, and the stress at 100% elongation ($M_{100}$) of the rubber composition satisfies the relationship of equation (i) below.

$$G' = K \times v \quad \text{(i)}$$

(In equation (i), G' is the shear modulus (MPa) at 0.28% shear stress at 110° C., K is a coefficient greater than 0 and not greater than 450, and v is a function represented by equation (ii) below and is a real number not less than 2.5 and not greater than 20.

$$v = \varphi \times (1 + 0.0258 \times CTAB \times M_{100}) \quad \text{(ii)}$$

In equation (ii), $\varphi$ is the volume fraction of the silica in the rubber composition, CTAB is the CTAB specific surface area (m²/g) of the silica, and $M_{100}$ is the stress (MPa) of the rubber composition at 100% elongation at 23° C.)

In the above-mentioned equation (i), G' is the shear modulus (MPa) at 0.28% shear strain at 110° C., and is an index representing the Payne effect of the rubber composition in which silica is blended.

That is, when G' is low, it means that the dispersibility of silica is good.

The function v is the function represented by the above-mentioned equation (ii), and correlates with the total volume of silica and bound rubber.

The function v is a real number not less than 2.5 and not greater than 20, and preferably from 3.0 to 16.

When v is less than 2.5, the interaction between silica and the rubber components is inadequate and wet performance cannot be sufficiently improved.

Furthermore, when the function v is greater than 20, rolling resistance cannot be sufficiently improved.

In the above-mentioned equation (i), K denotes the slope of the straight line connecting that point and the origin point when the function v is plotted on the horizontal axis and the shear modulus G' is plotted on the vertical axis, and is a real number greater than 0 and not greater than 450.

When the coefficient K is low, it means that the shear modulus G' (Payne effect) is small when the blended amount of silica is increased and the function v, which correlates with the volume of silica and bound rubber, is increased.

That is, wet grip performance and low rolling resistance can both be achieved at a high level because the Payne effect can be reduced while increasing the volume of silica and bound rubber.

For this reason, the coefficient K is not greater than 450, and is preferably a real number from 50 to 440.

When the coefficient K is greater than 450, both wet grip performance and low rolling resistance cannot be achieved.

In the above-mentioned equation (ii), $\varphi$ is the volume fraction of silica in the rubber composition, and is a real number greater than 0 and less than 1.

The volume fraction $\varphi$ can be determined from the blended amount (wt %) of silica in the rubber composition and the specific gravity of silica.

The silica volume fraction $\varphi$ is not particularly limited, but is preferably from 0.10 to 0.65 and more preferably from 0.12 to 0.55.

When the volume fraction $\varphi$ is less than 0.10, sufficient wet performance cannot be achieved.

When the volume fraction $\varphi$ is greater than 0.65, sufficient low rolling resistance cannot be achieved.

The CTAB specific surface area of the silica is preferably from 140 to 450 $m^2/g$ and more preferably from 150 to 400 $m^2/g$.

When the CTAB specific surface area is less than 140 $m^2/g$, sufficient wet performance cannot be achieved.

When the CTAB specific surface area is greater than 450 $m^2/g$, sufficient rolling resistance cannot be achieved.

In this specification, the CTAB specific surface area of silica is measured in accordance with JIS (Japanese Industrial Standard) K6217-3.

In the above-mentioned equation (ii), $M_{100}$ is the stress (MPa) of the rubber composition at 100% elongation at 23° C.

The stress $M_{100}$ is not particularly limited, but is preferably from 1.5 to 10 MPa and more preferably from 1.7 to 9.0 MPa.

When the stress $M_{100}$ is less than 1.5 MPa, low rolling resistance and wet performance decrease.

When the stress $M_{100}$ is greater than 10 MPa, rolling resistance deteriorates.

In this specification, the stress Mioo of the rubber composition at 100% elongation at 23° C. is the value obtained by measuring stress at 100% elongation when performing tensile testing at 500 mm/min at 23° C. in accordance with JIS K6251.

In the rubber composition for tires of the present technology, the silane coupling agent preferably contains a mercapto group.

By blending a silane coupling agent containing a mercapto group, silica dispersibility is improved.

The blended amount of the silane coupling agent is preferably from 1 to 25 wt % and more preferably from 3 to 20 wt % of the weight of the silica.

When the blended amount of the silane coupling agent is less than 1 wt %, there is the risk that it will not be possible to improve the dispersibility of the silica.

When the blended amount of the silane coupling agent is greater than 25 wt %, the rubber composition tends to vulcanize at an early stage and there is the risk that molding processability will deteriorate.

The silane coupling agent containing a mercapto group is preferably a polysiloxane having an average composition formula represented by general formula (1) below, which can enhance affinity with silica and improve its dispersibility.

These silane coupling agents may be blended individually or a plurality may be combined and blended.

$$(A)_a(B)_b(C)_c(D)_d(R^1)_e SiO_{(4-2a-b-c-d-e)/2} \quad (1)$$

(In the formula, A is a bivalent organic group containing a sulfide group; B is a monovalent hydrocarbon group having from 5 to 10 carbons; C is a hydrolyzable group; D is an organic group containing a mercapto group; $R^1$ is a monovalent hydrocarbon group having from 1 to 4 carbons; and a to e satisfy the relationships $0 \le a<1$, $0 \le b<1$, $0<c<3$, $0<d<1$, $0 \le e<2$, and $0<2a+b+c+d+e<4$;

however, at least one of a and b is not 0.)

The polysiloxane having the average composition formula represented by the above-mentioned general formula (1) is a mercaptosilane compound, and has a siloxane backbone as its backbone.

The siloxane backbone may be either a linear, branched, or three-dimensional structure, or a combination thereof.

In the above-mentioned general formula (1), at least one of a and b is not 0.

That is, at least one of a and b is greater than 0, and both a and b may be greater than 0.

Thus, this polysiloxane necessarily contains at least one selected from a bivalent organic group A containing a sulfide group and a monovalent hydrocarbon group B having from 5 to 10 carbons.

When the mercaptosilane compound containing the polysiloxane having the average composition formula represented by the above-mentioned general formula (1) contains the monovalent hydrocarbon group B having from 5 to 10 carbons, the mercapto groups are protected and the Mooney scorch time becomes longer, and at the same time, processability is further improved due to outstanding affinity with the rubber.

For this reason, it is preferable if the subscript b of the hydrocarbon group B in general formula (1) satisfies $0.10 \le b \le 0.89$.

Specific examples of the hydrocarbon group B are monovalent hydrocarbon groups having preferably from 6 to 10 carbons, and more preferably from 8 to 10 carbons, such as a hexyl group, an octyl group, a decyl group and the like.

As a result, the mercapto groups are protected, the Mooney scorch time becomes longer, and processability is better, and wet characteristics, wear resistance, and low rolling resistance are further improved.

When the silane compound containing the polysiloxane having the average composition formula represented by the above-mentioned general formula (1) contains the bivalent organic group A containing a sulfide group, wet performance, wear resistance, and processability (especially sustenance and prolongation of Mooney scorch time) are further improved.

For this reason, it is preferable if the subscript a of the bivalent organic group A containing a sulfide group in general formula (1) satisfies $0<a\leq 0.50$.

The bivalent organic group A containing a sulfide group may be, for example, a hydrocarbon group optionally having a hetero atom such as an oxygen atom, nitrogen atom, or sulfur atom.

The bivalent organic group A containing a sulfide group is preferably a group represented by general formula (2) below from the perspectives of improving silica dispersibility and further improving processability.

$$*-(CH_2)_n-S_x-(CH_2)_n-* \qquad (2)$$

In the above-mentioned general formula (2), n denotes an integer from 1 to 10, among which an integer from 2 to 4 is preferred.

Also, x denotes an integer from 1 to 6, among which an integer from 2 to 4 is preferred.

Furthermore, * indicates a bond position.

Specific examples of the group represented by the above-mentioned general formula (2) include $*-CH_2-S_2-CH_2-*$, $*-C_2H_4-S_2-C_2H_4-*$, $*-C_3H_6-S_2-C_3H_6-*$, $*-C_4H_8-S_2-C_4H_8-*$, $*-CH_2-S_4-CH_2-*$, $*-C_2H_4-S_4-C_2H_4-*$, $*-C_3H_6-S_4-C_3H_6-*$, $*-C_4H_8-S_4-C_4H_8-*$, and the like.

The silane compound containing a polysiloxane having the average composition formula represented by the above-mentioned general formula (1) has excellent affinity and/or reactivity with silica due to having a hydrolyzable group C.

In general formula (1), the subscript c of the hydrolyzable group C preferably satisfies $1.2\leq c\leq 2.0$ because wet characteristics and processability are further improved, silica dispersibility is further improved, and low rolling resistance is superior.

Specific examples of the hydrolyzable group C include an alkoxy group, a phenoxy group, a carboxyl group, an alkenyloxy group, and the like.

As the hydrolyzable group C, a group represented by general formula (3) below is preferred from the perspectives of improving silica dispersibility and further improving processability.

$$*-OR^2 \qquad (3)$$

In the above-mentioned general formula (3), * denotes a bond position.

Furthermore, $R^2$ denotes an alkyl group having from 1 to 20 carbons, an aryl group having from 6 to 10 carbons, an aralkyl group (aryl-alkyl group) having from 6 to 10 carbons, or an alkenyl group having from 2 to 10 carbons, among which an alkyl group having from 1 to 5 carbons is preferred.

Specific examples of the alkyl group having from 1 to 20 carbons include a methyl group, an ethyl group, a propyl group, a butyl group, a hexyl group, an octyl group, a decyl group, an octadecyl group, and the like.

Specific examples of the aryl group having from 6 to 10 carbons include a phenyl group, a tolyl group, and the like.

Specific examples of the aralkyl group having from 6 to 10 carbons include a benzyl group, a phenylethyl group, and the like.

Specific examples of the above-mentioned alkenyl group having from 2 to 10 carbons include a vinyl group, a propenyl group, a pentenyl group, and the like.

The silane compound containing a polysiloxane having the average composition formula represented by the above-mentioned general formula (1) has interaction and/or reactivity with diene rubber and has excellent wet performance and wear resistance due to having an organic group D containing a mercapto group.

It is preferable if the subscript d of the organic group D containing a mercapto group satisfies $0.1\leq d\leq 0.8$.

The organic group D containing a mercapto group is preferably a group represented by general formula (4) below from the perspectives of improving silica dispersibility and further improving processability.

$$*-(CH_2)_m-SH \qquad (4)$$

In the above-mentioned general formula (4), m denotes an integer from 1 to 10, among which an integer from 1 to 5 is preferred.

In the formula, * indicates a bond position.

Specific examples of the group represented by the above-mentioned general formula (4) are $*-CH_2SH$, $*-C_2H_4SH$, $*-C_3H_6SH$, $*-C_4H_8SH$, $*-C_5H_{10}SH$, $*-C_6H_{12}SH$, $*-C_7H_{14}SH$, $*-C_8H_{16}SH$, $*-C_9H_{18}SH$, and $*-C_{10}H_{20}SH$.

In the above-mentioned general formula (1), $R^1$ denotes a monovalent hydrocarbon group having from 1 to 4 carbons.

Examples of the hydrocarbon group $R^1$ include a methyl group, an ethyl group, a propyl group, and a butyl group.

In the above-mentioned general formula (1), a to e satisfy the relationships $0\leq a<1$, $0\leq b<1$, $0<c<3$, $0<d<1$, $0\leq e<2$, $0<2a+b+c+d+e<4$;

however, at least one of a and b is not 0.

Here, at least one of a and b not being 0 means that when $a=0$, $0<b$, and when $b=0$, $0<a$.

Note that both $0<a$ and $0<b$ is possible.

Furthermore, a rubber composition satisfying the above-mentioned equation (i) can be prepared by adjusting the kneading conditions of the rubber composition.

As the conditions when kneading silica into the diene rubber, for example, when a silane coupling agent containing a mercapto group is blended, the temperature is preferably from 120 to 170° C. and more preferably from 130 to 160° C., and after this temperature is reached, kneading is preferably performed for 1 to 15 min and more preferably for 2 to 10 min.

On the other hand, as the kneading conditions of a rubber composition in which a silane coupling agent not containing a mercapto group is blended, the temperature is preferably from 150 to 175° C. and more preferably from 155 to 170° C., and after this temperature is reached, kneading is preferably performed for 2 to 15 min and more preferably for 3 to 10 min.

In the present technology, compounding agents other than those described above may be added.

As other compounding agents, various compounding agents commonly used in rubber compositions for tires may be compounded. Examples thereof include reinforcing fillers other than silica, vulcanization or crosslinking agents, vulcanization accelerators, antiaging agents, liquid polymers, thermosetting resins, and the like.

These compounding agents can be compounded in typical amounts conventionally used so long as the objects of the present technology are not hindered.

Furthermore, as the kneading machine, a commonly used rubber kneading machine such as a Banbury mixer, a kneader, a roller, or the like may be used.

Examples of another reinforcing filler include carbon black, clay, mica, talc, calcium carbonate, aluminum hydroxide, aluminum oxide, and titanium oxide.

Among these, carbon black is preferred because it can enhance the hardness, strength, and wear resistance of the rubber composition.

The compounded amount of the carbon black is preferably from 1 to 15 parts by weight and more preferably from 2 to 10 parts by weight per 100 parts by weight of the diene rubber.

The rubber composition for tires of the present technology can be advantageously used in pneumatic tires.

The low rolling resistance and the wet grip performance can be enhanced to or beyond conventional levels in a pneumatic tire in which this rubber composition is used in the tread portion.

The present technology is further described below using examples. However, the scope of the present technology is not limited to these examples.

EXAMPLES

Eighteen types of rubber composition for tires (Working Examples 1 to 9 and Comparative Examples 1 to 9) were prepared according to the formulations shown in Tables 1 and 2 with the compounding agents shown in Table 3 used as common components. With the exception of the sulfur and the vulcanization accelerators, the components were kneaded in a 1.7 L sealed Banbury mixer for 5 min. The mixer was then opened and the mixture cooled to room temperature.

The sulfur and the vulcanization accelerators were then added to the cooled mixture, and they were mixed in the 1.7 L sealed Banbury mixer to produce a rubber composition for tires.

Furthermore, the compounded amounts of the compounding agents shown in Table 3 are expressed as values in parts by weight per 100 parts by weight of the diene rubbers shown in Tables 1 and 2.

The obtained 18 types of rubber composition were vulcanization by compression molding at 160° C. for 30 min in a predetermined mold to produce test pieces formed from the rubber compositions for tires.

Using the obtained test pieces, the shear modulus G' at 0.28% shear strain and the stress $M_{100}$ at 100% elongation were evaluated by the following methods.
Shear Modulus G' at 0.28% Shear Strain The viscoelasticity of the obtained test pieces was measured at 0.28% shear strain at 110° C. using a viscoelasticity measurement instrument (RPA2000, manufactured by Alpha Technology Co., Ltd.), and the shear modulus G' was determined.
Stress $M_{100}$ at 100% Elongation The tensile properties of the obtained test pieces were measured at 500 mm/min at 23° C. in accordance with JIS K6251, and the stress $M_{100}$ at 100% elongation was determined.

Furthermore, wet grip performance and rolling resistance were evaluated by the following methods using the obtained test pieces.
Wet Grip Performance Using the test pieces, the effective coefficient of friction μ against a wet concrete road surface at room temperature was measured using a wet skid resistance portable skid resistance tester (TR-300, manufactured by Tanifuji Machinery Ltd.).

The obtained results are shown on the "Wet grip performance" rows of Tables 1 and 2, with the index value of Comparative Example 1 being defined as 100.

A larger index value indicates that wet skid resistance is high and wet grip performance is superior.

Rolling Resistance

Using the test pieces, the rebound elastic modulus was measured at 40° C. in accordance with JIS K6255.

The obtained results are shown in the "Rolling resistance" rows of Tables 1 and 2, with the index value of Comparative Example 1 being defined as 100.

Smaller index values indicate that the rebound elastic modulus is low and rolling resistance is low.

TABLE 1-1

| | | Comparative Example 1 | Comparative Example 2 | Comparative Example 3 |
|---|---|---|---|---|
| SBR | Parts by weight | 100 | 100 | 100 |
| Silica 1 | Parts by weight | 70 | 92 | |
| Silica 2 | Parts by weight | | | 70 |
| Silica 3 | Parts by weight | | | |
| Silica 4 | Parts by weight | | | |
| Coupling agent 1 | Parts by weight | 7.2 | 7.36 | 5.6 |
| Silica volume fraction φ | — | | 0.19 | 0.24 | 0.19 |
| Silica CTAB | m²/g | 155 | 155 | 240 |
| Tensile stress $M_{100}$ | MPa | 2.1 | 3.2 | 2.0 |
| Function ν | — | 1.8 | 3.3 | 2.6 |
| Shear modulus G' | MPa | 1436 | 3528 | 1623 |
| Coefficient K | — | 798 | 1069 | 624 |
| Rolling resistance | Index value | 100 | 110 | 109 |
| Wet grip performance | Index value | 100 | 109 | 107 |

TABLE 1-2

| | | Comparative Example 4 | Comparative Example 5 | Comparative Example 6 |
|---|---|---|---|---|
| SBR | Parts by weight | 100 | 100 | 100 |
| Silica 1 | Parts by weight | | | |
| Silica 2 | Parts by weight | 92 | | |
| Silica 3 | Parts by weight | | 45 | 70 |
| Silica 4 | Parts by weight | | | |
| Coupling agent 1 | Parts by weight | 7.36 | 3.6 | 5.6 |
| Silica volume fraction φ | — | 0.24 | 0.14 | 0.19 |
| Silica CTAB | m²/g | 240 | 280 | 280 |
| Tensile stress $M_{100}$ | MPa | 3.0 | 1.8 | 2.3 |
| Function ν | — | 4.7 | 2.0 | 3.4 |
| Shear modulus G' | MPa | 4596 | 861 | 2035 |
| Coefficient K | — | 978 | 431 | 599 |
| Rolling resistance | Index value | 116 | 72 | 127 |
| Wet grip performance | Index value | 114 | 95 | 112 |

TABLE 1-3

| | | Comparative Example 7 | Comparative Example 8 | Comparative Example 9 |
|---|---|---|---|---|
| SBR | Parts by weight | 100 | 100 | 100 |
| Silica 1 | Parts by weight | | | |
| Silica 2 | Parts by weight | | | |
| Silica 3 | Parts by weight | 100 | | |
| Silica 4 | Parts by weight | | 70 | 100 |
| Coupling agent 1 | Parts by weight | 8.0 | 5.6 | 8.0 |
| Silica volume fraction φ | — | 0.25 | 0.19 | 0.25 |
| Silica CTAB | m²/g | 280 | 170 | 170 |

TABLE 1-3-continued

|  |  | Comparative Example 7 | Comparative Example 8 | Comparative Example 9 |
|---|---|---|---|---|
| Tensile stress $M_{100}$ | MPa | 3.6 | 2.2 | 3.3 |
| Function ν | — | 6.7 | 2.0 | 3.9 |
| Shear modulus G' | MPa | 5941 | 2010 | 4586 |
| Coefficient K | — | 887 | 1005 | 1176 |
| Rolling resistance | Index value | 116 | 118 | 121 |
| Wet grip performance | Index value | 120 | 95 | 99 |

TABLE 2-1

|  |  | Working Example 1 | Working Example 2 | Working Example 3 | Working Example 4 | Working Example 5 |
|---|---|---|---|---|---|---|
| SBR | Parts by weight | 100 | 100 | 100 | 100 | 100 |
| Silica 1 | Parts by weight |  |  |  |  |  |
| Silica 2 | Parts by weight | 70 | 100 | 150 |  |  |
| Silica 3 | Parts by weight |  |  |  | 70 | 150 |
| Coupling agent 2 | Parts by weight | 7.7 | 11.0 | 16.5 | 7.7 | 16.5 |
| Coupling agent 3 | Parts by weight |  |  |  |  |  |
| Silica volume fraction ϕ | — | 0.19 | 0.25 | 0.32 | 0.19 | 0.32 |
| Silica CTAB | m²/g | 240 | 240 | 240 | 280 | 280 |
| Tensile stress $M_{100}$ | MPa | 3.5 | 2.9 | 6.9 | 4.7 | 6.7 |
| Function ν | — | 4.3 | 4.7 | 13.9 | 6.6 | 15.8 |
| Shear modulus G' | MPa | 1251 | 1386 | 4055 | 2100 | 5100 |
| Coefficient K | — | 291 | 295 | 292 | 318 | 323 |
| Rolling resistance | Index value | 69 | 85 | 92 | 75 | 97 |
| Wet grip performance | Index value | 113 | 117 | 124 | 124 | 128 |

TABLE 2-2

|  |  | Working Example 6 | Working Example 7 | Working Example 8 | Working Example 9 |
|---|---|---|---|---|---|
| SBR | Parts by weight | 100 | 100 | 100 | 100 |
| Silica 1 | Parts by weight | 70 | 150 | 70 | 150 |
| Silica 2 | Parts by weight |  |  |  |  |
| Silica 3 | Parts by weight |  |  |  |  |
| Coupling agent 2 | Parts by weight | 7.7 | 16.5 |  |  |
| Coupling agent 3 | Parts by weight |  |  | 7.7 | 16.5 |
| Silica volume fraction ϕ | — | 0.19 | 0.32 | 0.19 | 0.32 |
| Silica CTAB | m²/g | 155 | 155 | 155 | 155 |
| Tensile stress $M_{100}$ | MPa | 3.3 | 8.2 | 3.1 | 7.6 |
| Function ν | — | 2.7 | 10.8 | 2.5 | 10.0 |
| Shear modulus G' | MPa | 1050 | 2860 | 1095 | 3050 |
| Coefficient K | — | 389 | 265 | 430 | 304 |
| Rolling resistance | Index value | 65 | 90 | 71 | 93 |
| Wet grip performance | Index value | 117 | 122 | 114 | 118 |

The types of raw materials used as per Tables 1 and 2 are described below.

SBR: Styrene-butadiene rubber; Nipol 1502, manufactured by Zeon Corporation

Silica 1: Zeosil 1165MP, manufactured by Solvay Corporation; CTAB specific surface area 155 m²/g Silica 2: Ultrasil 9000GR, manufactured by Evonik Industries AG; CTAB specific surface area 240 m²/g Silica 3: Hisil EZ200G, manufactured by PPG Industries, Inc.; CTAB specific surface area 280 m²/g Silica 4: Ultrasil VN3GR, manufactured by Evonik Industries AG; CTAB specific surface area 170 m²/g Coupling agent 1: Sulfur-containing silane coupling agent, bis(3-triethoxysilylpropyl)tetrasulfide; Si69, manufactured by Evonik Industries AG Coupling agent 2: Polysiloxane synthesized by the production method described below Coupling agent 3: Silane coupling agent containing a mercapto group; NXT-Z45, manufactured by Momentive Corporation Production Method of Coupling Agent 2

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2-L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature.

It was then stirred for 2 hours at 80° C.

Then, it was filtered, and 17.0 g of 5% KOH/EtOH solution was added in a dropwise manner to the obtained filtrate, and stirred for 2 hours at 80° C.

Then, by vacuum concentration and filtration, 480.1 g of polysiloxane in the form of a brown transparent liquid was obtained.

As a result of measurement by gel permeation chromatography, the average molecular weight was 840, and the average degree of polymerization was 4.0 (preset degree of polymerization: 4.0).

In addition, as a result of measuring the mercapto equivalent weight by the acetic acid/potassium iodide/potassium iodate addition-sodium thiosulfate solution titration method, the equivalent weight was 730 g/mol, and it was thus confirmed that the preset mercapto group content was achieved.

The polysiloxane obtained as described above is represented by the following average composition formula.

$(-C_3H_6-S_4-C_3H_6-)_{0.071}(-C_8H_{17})_{0.571}(-OC_2H_5)_{1.50}(-C_3H_6SH)_{0.286}SiO_{0.75}$

The obtained polysiloxane was used as coupling agent 2.

TABLE 3

| Common components of the rubber compositions | | |
|---|---|---|
| Carbon black | 4.0 | Parts by weight |
| Zinc oxide | 2.5 | Parts by weight |
| Stearic acid | 2.5 | Parts by weight |
| Anti-aging agent | 1.0 | Parts by weight |
| Processing aid | 2.0 | Parts by weight |
| Oil | 25.0 | Parts by weight |
| Sulfur | 1.5 | Parts by weight |
| Vulcanization accelerator 1 | 1.7 | Parts by weight |
| Vulcanization accelerator 2 | 1.5 | Parts by weight |

The types of raw materials used as per Table 3 are shown below.
Carbon black: SEAST KH manufactured by Tokai Carbon Co., Ltd.
Zinc oxide: Zinc Oxide #3, manufactured by Seido Chemical Industry Co., Ltd.
Stearic acid: Beads Stearic Acid YR, manufactured by NOF Corp.
Anti-aging agent: 6PPD, manufactured by Flexsys
Processing aid: Struktol EF44, manufactured by Schill & Seilacher GmbH
Oil: Extract No. 4S, manufactured by Showa Shell Sekiyu K.K.
Sulfur: Golden Flower oil treated sulfur powder, manufactured by Tsurumi Chemical Industry Co., Ltd.
Vulcanization accelerator 1: Noccelar CZ-G, manufactured by Ouchi Shinko Chemical Industrial Co., Ltd.
Vulcanization accelerator 2: Soxinol D-G, manufactured by Sumitomo Chemical Co., Ltd.

As is clear from Tables 1 to 2, it was confirmed that the rubber compositions for tires produced by Working Examples 1 to 9 had superior low rolling resistance and wet grip performance.

In the rubber composition of Comparative Example 2, the amount of silica 1 was increased relative to the rubber composition of Comparative Example 1 and the function v became not less than 2.5, but since the coefficient K was greater than 450, rolling resistance deteriorated.

In the rubber compositions of Comparative Examples 3 and 4, silica 2 having a large CTAB specific surface area was blended, but since the coefficient K was greater than 450, rolling resistance deteriorated.

The rubber composition of Comparative Example 5 contained little of silica 3 and the function v was less than 2.5, and therefore wet grip performance deteriorated.

In the rubber compositions of Comparative Examples 6 and 7, the amount of silica 3 was increased and the function v became not less than 2.5, but since the coefficient K was greater than 450, rolling resistance deteriorated.

In the rubber composition of Comparative Example 8, silica 1 was replaced with silica 4, but since the function v was less than 2.5 and the coefficient K was not less than 450, rolling resistance and wet performance deteriorated.

In the rubber composition of Comparative Example 9, the amount of silica 4 was increased and the function v became not less than 2.5, but since the coefficient K was not less than 450, rolling resistance deteriorated.

The invention claimed is:
1. A rubber composition for tires, the rubber composition comprising:
a diene rubber;
silica; and
a silane coupling agent; wherein
a function v of a shear modulus G' of the rubber composition at 0.28% shear stress at 110° C., a CTAB specific surface area (CTAB) of the silica, a volume fraction ($\varphi$) of the silica in the rubber composition, and a stress at 100% elongation ($M_{100}$) of the rubber composition satisfies a relationship of equation (i) below, and the function v is a real number not less than 2.5 and not greater than 20;

$$G' = K \times v \qquad (i)$$

in equation (i), G' is the shear modulus (MPa) at 0.28% shear stress at 110° C., K is a coefficient greater than 0 and not greater than 450, and v is a function represented by equation (ii) below and is a real number not less than 2.5 and not greater than 20;

$$v = \varphi \times (1 + 0.0258 \times CTAB \times M_{100}) \qquad (ii)$$

in equation (ii), $\varphi$ is the volume fraction of the silica in the rubber composition, CTAB is the CTAB specific surface area (m²/g) of the silica, and $M_{100}$ is the stress (MPa) of the rubber composition at 100% elongation at 23° C.

2. The rubber composition for tires according to claim 1, wherein the silane coupling agent contains a mercapto group.

3. The rubber composition for tires according to claim 1, wherein the silane coupling agent is a polysiloxane having an average composition formula represented by general formula (1) below;

$$(A)_a(B)_b(C)_c(D)_d(R^1)_e SiO_{(4-2a-b-c-d-e)/2} \qquad (1)$$

in the formula, A is a bivalent organic group containing a sulfide group; B is a monovalent hydrocarbon group having from 5 to 10 carbons; C is a hydrolyzable group; D is an organic group containing a mercapto group; $R^1$ is a monovalent hydrocarbon group having from 1 to 4 carbons; and a to e satisfy relationships $0 \leq a < 1$, $0 \leq b < 1$, $0 < c < 3$, $0 < d < 1$, $0 \leq e < 2$, and $0 < 2a+b+c+d+e < 4$;
and at least one of a and b is not 0.

4. The rubber composition for tires according to claim 3, wherein, in the general formula (1), $0 < a < 1$ and $0 < c < 3$, and A, C, and D are represented by general formulas (2), (3), and (4), respectively, below;

$$*-(CH_2)_n-S_x-(CH_2)_n-* \qquad (2)$$

in general formula (2), n denotes an integer from 1 to 10, x denotes an integer from 1 to 6, and * denotes a bond position;

$$*-OR^2 \qquad (3)$$

in general formula (3), $R^2$ denotes an alkyl group having from 1 to 20 carbons, an aryl group having from 6 to 10 carbons, or an alkenyl group having from 2 to 10 carbons, and * denotes a bond position;

$$*-(CH_2)_m-SH \qquad (4)$$

in general formula (4), m denotes an integer from 1 to 10, and * denotes a bond position.

5. A pneumatic tire comprising the rubber composition for tires described in claim 1.

6. The rubber composition for tires according to claim 2, wherein the silane coupling agent is a polysiloxane having an average composition formula represented by general formula (1) below;

$$(A)_a(B)_b(C)_c(D)_d(R^1)_e SiO_{(4-2a-b-c-d-e)/2} \quad (1)$$

in the formula, A is a bivalent organic group containing a sulfide group; B is a monovalent hydrocarbon group having from 5 to 10 carbons; C is a hydrolyzable group; D is an organic group containing a mercapto group; $R^1$ is a monovalent hydrocarbon group having from 1 to 4 carbons; and a to e satisfy relationships $0 \leq a < 1$, $0 \leq b < 1$, $0 < c < 3$, $0 < d < 1$, $0 \leq e < 2$, and $0 < 2a+b+c+d+e < 4$; and at least one of a and b is not 0.

7. The rubber composition for tires according to claim 6, wherein, in the general formula (1), $0 < a < 1$ and $0 < c < 3$, and A, C, and D are represented by general formulas (2), (3), and (4), respectively, below;

$$*-(CH_2)_n-S_x-(CH_2)_n-* \quad (2)$$

in general formula (2), n denotes an integer from 1 to 10, x denotes an integer from 1 to 6, and * denotes a bond position;

$$*-OR^2 \quad (3)$$

in general formula (3), $R^2$ denotes an alkyl group having from 1 to 20 carbons, an aryl group having from 6 to 10 carbons, or an alkenyl group having from 2 to 10 carbons, and * denotes a bond position;

$$*-(CH_2)_m-SH \quad (4)$$

in general formula (4), m denotes an integer from 1 to 10, and * denotes a bond position.

8. A pneumatic tire comprising the rubber composition for tires described in claim 7.

* * * * *